UNITED STATES PATENT OFFICE.

GEORGES NUTH, OF MARSEILLE, FRANCE.

PROCESS FOR THE PREPARATION OF ELASTIC PRODUCTS AND SUBSTITUTES FOR NATURAL LACS.

1,159,258. Specification of Letters Patent. Patented Nov. 2, 1915.

No Drawing. Application filed December 27, 1911. Serial No. 668,148.

*To all whom it may concern:*

Be it known that I, GEORGES NUTH, a citizen of the Republic of France, residing at Marseille, Bouches du Rhône, France, have invented a Process for the Preparation of Elastic Products and Substitutes for Natural Lacs, of which the following is a specification.

In the specification of my copending application Serial No. 522,773 are described processes for the preparation of elastic products and substitutes for natural lacs by the action of amins upon "factices" or, in other words, upon the products of the reaction of certain fatty bodies with the protohalogen compounds of sulfur. As the result of his researches on this subject the applicant has found that the condensation products of these same fatty bodies with other halogen derivatives of sulfur likewise lend themselves to reaction with the amins, even ammonia, giving rise to new interesting products and particularly to elastic substances and substitutes for natural lacs. This other group of condensation products formed between fatty bodies and halogen derivatives of sulfur will likewise be designated "factices." Furthermore the said researches have proved that it is not only the primary and secondary amins which react with the factices, but the tertiary amins do so also, giving rise to the formation of elastic products varying from soft to hard.

The nature of the action of the amins upon the factices depends upon the nature of the amin and the working conditions. Thus for example the amin may cause the formation of halogenated hydrogen, which may result from the substitution of one or more atoms of halogen in the factice by the amin radicals, or from the separation from the molecules of the factice of one or more molecules of halogenated hydrogen, which may thus cause new unsaturated linkings. Finally the two reactions may take place simultaneously. The action of the amins upon the factices described in the specification of my copending application Serial No. 522,773 may also be explained on similar lines. Besides the protohalogen compounds of sulfur which form the subject matter of the prior patent hereinabove referred to, the applicant has chiefly in view, among the other halogen derivatives of sulfur, the dichlorid of sulfur of commerce. The existence of dichlorid of sulfur as a distinct chemical body has often been doubted by various authors. The recent researches of Beckmann however show that this body does really exist and form the major portion of the dichlorid of sulfur of commerce.

The products obtained by the action of amins upon the products of condensation between this other group of halogen derivatives of sulfur and certain fatty bodies, are viscous masses up to the solid state, and elastic, and often possess great cohesion, or are hard and brittle masses. In consequence of the creation of the new unsaturated linkings above mentioned, these masses can ordinarily be vulcanized by means of sulfur, or halogen compounds of sulfur. Thus for example elastic products which vary from soft to hard and which resemble in their properties vulcanized or raw rubber can be so obtained. On the other hand these same derivatives from factices and amins, if they are not already very hard, have a tendency to undergo further solidification under certain conditions. This phenomenon is probably due to polymerization. It is produced by the action of time, heat, oxidizing agents, and also by auto-oxidation. When so transformed these products form materials which are either elastic or brittle and which ordinarily lend themselves to vulcanization, yielding elastic or brittle products. In like manner products slightly vulcanized can be further hardened by polymerization.

The products in question are generally insoluble in alcohol of ninety (90) degrees, but mostly so when they are freshly prepared. They are soluble in benzol provided that complex amins have not been used in their preparation. This solubility is greatly diminished by polymerization or vulcanization in accordance with the degree of polymerization or vulcanization.

The materials of which the general properties have just been described may be employed, if elastic, for numerous purposes as substitutes for rubber and gutta-percha. On the other hand however, these materials, be they elastic or brittle, may, when they are soluble in suitable solvents, be employed as varnishing compounds, and yield after volatilization of the solvent, an adherent, flexible, transparent and brilliant film. By their resistance to heat, water, and alkalis they are distinguished with advantage from the varnishes obtained by means of natural lacs or gums. As hereinbefore stated the bodies to be considered for the preparation of these products are the fatty bodies such for example as linseed, China wood, poppy, maize, cotton, sesame, colza, almond, earth nut, olive, castor and codliver oils, neat's foot oil and palm oil: finally the fatty oxidized, polymerized, sulfureted, sulfureted and oxidized, oxidized and sulfureted or nitrated oils, in general the fatty oils and bodies which are capable of reacting with the halogen derivatives of sulfur.

With regard to the amins, those of both the fatty and aromatic series may be employed, even ammonia and substances which easily give up or evolve ammonia or amins, such for example as anilin, para-toluidin, metaxylidin, alpha - naphthylamin, para-chloranilin, meta-nitranilin, dinitroanilin 1:2:5. dehydrothiotoluidin, phenylhydrazin, meta-amidophenol, amidonaphthol 1:5, meta-amido-benzoic acid, sulfanilic acid, naphthionic acid, amido-naphthosulfonic acid G or the salts of these acids: mono-methylanilin, diphenylamin, para-tolyl-alpha-naphthyl-amin, dimethylanilin, acetanilid, phenetedin, benzamid, meta-phenylenediamin, benzidin, mono - methyl - para-phenylene-diamin, di - methyl - para - phenylene - diamin, para - amidodiphenylamin, acetylbenzidin, diamidodiphenylurea, amidoazobenzol, para-amidoazobensol - alpha - naphthylamin, tri-amidoazobenzol, rosanilin, indulins, saffranins, pyridin, etc.; finally, ammonia, trimethylamin, benzylamin: amidoacetic, phenylamidoacetic and amido-succinic acids or their salts: the ethyl ester of amidoacetic acid, carbamid, thiocarbamid, guanidin, ethylenediamin, sodamid, anilid of potassium, cyanamid, etc.

For the preparation of these substances in question the amin is caused to act directly on the factice, (after this latter has been purified if this is an advantage) or the reactive substances may be diluted with products suitable for this operation. The work may be carried out in open or closed vessels according to requirements. The addition of certain products, such as acetate of soda, carbonate of lime, chlorid of copper, etc., which facilitate the reaction between halogen products and amins, is sometimes allowable or desirable. The polymerization of these masses may be produced in suitable ways as for example: by the action of air, by spreading out the mass in thin layers. By heating the mass on the water bath or in an oven and passing a current of air or oxygen through the hot solution, or a current of ozone through the cold solution of the mass. By mixing the products or their solutions with oxidizing bodies either hot or cold.

The vulcanization with sulfur, may be effected according to the processes in use for the vulcanization of rubber, but vulcanization may also be carried out in solution.

Vulcanization with halogen compounds of sulfur is preferably effected with a suitable solution of the mass. By way of example there will now be given, first of all, the methods of preparation of some factices by means of oils and dichlorid of sulfur of commerce. It is obvious of course that by varying the proportions between the oils and the dichlorids of sulfur different factices will be obtained.

Example A: A mixture of ten (10) parts of linseed oil and forty (40) parts of toluene is mixed, while being well stirred, with a solution of three (3) parts of dichlorid of sulfur in fifteen (15) parts of toluene. A gelatinous, transparent and nearly colorless mass gradually forms which separates from the toluene. The mass becomes elastic and has the appearance of the ordinary linseed oil factice, that is to say of the factice of linseed oil prepared with the protochlorid of sulfur.

Example B: Ten (10) parts of China wood oil and thirty (30) parts of toluene are mixed with three (3) parts of dichlorid of sulfur this latter being previously diluted with eight (8) parts of toluene. Shortly afterward a clear, gelatinous mass of a faint yellow color is formed. This is left to stand for some time and then spread out to eliminate the toluene. A clotted product results which is of a very slight yellow color, elastic to compression, but possessing very little cohesion.

Example C: Fifteen (15) parts of poppy oil mixed with forty five (45) parts of toluene are mixed with a solution of four (4) parts of dichlorid of sulfur in twelve (12) parts of toluene. Within twentyfour hours the mixture will have been transformed into a colorless mass which is gelatinous and slightly viscous. When freed from the toluene it forms a colorless, soft, rather sticky product, elastic to compression and possessing slight cohesion.

Example D: By causing twentyfive (25) parts of castor oil diluted with seventy five (75) parts of toluene to react with a solution of six (6) parts of dichlorid of sulfur in fifteen (15) parts of toluene a compact mass is formed which is cut up to better separate the solvent from it and a dry product which is almost colorless and rather elastic to compression is finally formed.

Example E: A mixture of five (5) parts of olive oil and five (5) parts of benzol is added to one (1) part of dichlorid of sulfur previously diluted with one (1) part of benzol. Shortly afterward this mixture becomes transformed into a gelatinous and nearly colorless mass which, after the evaporation of the benzol, forms an almost colorless and clotted elastic substance.

Example F: Four (4) parts of cod liver oil diluted with eight (8) parts of toluene are mixed with one (1) part of dichlorid of sulfur. The mixture is allowed to stand until it has become transformed into an elastic and slightly gelatinous mass which, when freed from the toluene, becomes a faintly colored, clotted product, elastic to compression but possessing scarcely any cohesion.

Example G: Three (3) parts of dichlorid of sulfur previously diluted with fifteen (15) parts of benzol are caused to act on a mixture of fifteen (15) parts of oxidized linseed oil and forty (40) parts of benzol. A solid, transparent, brown-yellow colored mass is rapidly formed, which, after evaporation of the benzol, becomes a brown mass elastic to compression. The oxidized linseed oil is prepared by causing a current of air to pass through the linseed oil heated to about two hundred and fifty (250) degrees C., until the oil has become viscous.

Example H: Fifteen (15) parts of sulfureted castor oil are mixed with thirty (30) parts of benzol, and a mixture of two (2) parts of dichlorid of sulfur and ten (10) parts of benzol are then added. The mixture is afterward gently heated. The mass thickens by degrees and after having been allowed to stand the benzol is evaporated off and a brown product thus obtained which is slightly sticky, rather elastic to compression and possesses a slight amount of cohesion. For the preparation of the sulfureted castor oil, the castor oil is heated to about one hundred and eighty (180) degrees C. and there is then introduced, little by little, keeping the temperature of the oil at from one hundred and eighty to two hundred (180 to 200) degrees C., a quantity of sulfur corresponding to four per cent. of the quantity of castor oil employed.

Example I: A mixture of seven (7) parts of sulfureted boiled linseed oil and fourteen (14) parts of heavy benzin is added to one (1) part of dichlorid of sulfur. Little by little this mixture solidifies and forms a gelatinous and glutinous mass. Washed with alcohol and dried, this substance becomes firmer but still remains rather glutinous. The sulfureted boiled linseed oil is prepared by heating the boiled linseed oil of commerce to from one hundred and sixty to one hundred and seventy (160 to 170) degrees C. and then introducing into it little by little a quantity of sulfur corresponding to four per cent. of the weight of the boiled linseed oil. Afterward the temperature is kept up for about an hour at from one hundred and seventy to one hundred and eighty (170 to 180) degrees C. By way of example and without the invention being limited thereto, sundry methods of formation of the new substances in question will be hereinafter given. In this specification the lengths of time and temperatures must always be understood to be approximate. The temperatures given are those in general which are obtained by means of an oil bath.

Example 1: In a vessel on an oil bath are placed three (3) parts of anilin and one (1) part of linseed oil factice by dichlorid of sulfur, obtained as in Example A. The mixture is heated to about one hundred and twenty-five (125) degrees C. and this temperature is kept up for about five hours, with stirring. The factice disappears little by little. The clear liquid is poured into about ten (10) parts of toluene and then left to stand so that the anilin hydrochlorid which is formed may settle. The mixture is then filtered. The filtrate is then mixed with alcohol which precipitates the new product in the form of a very fine and faintly colored precipitate which coagulates rapidly. After some time, the supernatant liquid is decanted. The residue forms a liquid mass. By being washed with alcohol it solidifies and finally becomes a slightly gelatinous product which is elastic and of a slight brown color. The decanted liquid is worked up by known processes for the purpose of recovering the anilin, the toluene and the alcohol. The new product prepared as has just been described, is fairly well soluble in benzol yielding a limpid and almost colorless solution, which gives no precipitate with oil of turpentine, ether or nitrobenzol. When applied to an article it leaves, after evaporation of the solvent, an adherent film which is easily handled and which hardens rapidly in the air. By heating this new product for about an hour to from one hundred to one hundred and ten (100 to 110) degrees C., it is transformed into a resinous mass of good cohesion but of which the solubility is very much lessened. It is obvious of course that the new product might be effectively separated and isolated in other ways, as for example by pouring the product of the fusion of the anilin factice in a thin stream into water and causing at the same time a jet of dilute hydrochloric acid to flow in so as to transform the excess of anilin into its salt. The reaction product will separate in the form of a viscous mass which will be washed with water, then dissolved in benzol or dried, according to the use to which it is intended that it shall be put. The anilin may also be removed by subjecting the fused anilin factice to a current of steam.

Example 2: A hot solution of ten (10) parts of para-chloranilin in fifty five (55)

parts of heavy benzin is added to ten (10) parts of sulfur dichlorid linseed oil factice (Example A) and then heated for about ten hours at one hundred and thirty five (135) degrees C. The liquid formed is then dissolved in benzol, and filtered to recover the para-chloranilin hydrochlorid. By the addition of alcohol to the filtrate the new product separates and coagulates pretty rapidly. Shortly afterward the supernatant liquid is decanted. The residue forms a rather solid and stringy mass. Washed with alcohol, it becomes transformed into an elastic mass which is slightly gelatinous. Its solution in toluene leaves when exposed to the air a nearly colorless, adherent and easily handled film.

Example 3: A mixture of seven (7) parts of metanitranilin, forty-five (45) parts of heavy benzin and ten (10) parts of sulfur dichlorid linseed oil factice (Example A) is heated for six to seven hours at from one hundred and thirty to one hundred and forty (130 to 140) degrees C. The fused mass is then diluted with fifty (50) parts of toluene and separated from the meta-nitranilin hydrochlorid by filtration. Alcohol produces in the filtrate a brown fine precipitate which coagulates shortly afterward. The supernatant liquid is removed by decantation. Washed with alcohol the residue forms a slightly soft mass of a dark brown color which is very elastic to compression and when pulled. Its solution in toluene which is greenish-yellow, leaves when exposed to air, a greenish-yellow, adherent, transparent film which hardens well.

Example 4: One (1) part of sulfur dichlorid China wood oil factice (see Example B) is caused to react with one (1) part of para-toluidin and five (5) parts of heavy benzin, the mixture being heated to one hundred and twenty five (125) degrees C. and then at from one hundred and twenty five to one hundred and thirty (125 to 130) degrees C. for from seven to eight hours. The cooled fused mass is diluted with about double its volume of toluene and is then filtered. After precipitation of the filtrate with alcohol, the supernatant liquid is decanted off, the residue washed with alcohol and there is thus obtained a soft mass which is slightly gelatinous and rather elastic and the solution of which in toluene yields, when applied to articles, a very slightly colored, very flexible, adherent film which hardens well. By heating it to about one hundred (100) degrees C. this mass hardens considerably forming an elastic product of good cohesion and slightly resinous appearance.

Example 5: A mixture of one (1) part of sulfur dichlorid China wood oil factice (Example B) and four (4) parts of monoethyl-para-toluidin is heated to about one hundred and thirty five (135) degrees C. and then for from ten to twelve hours at from one hundred and thirty five to one hundred and forty (135 to 140) degrees C. A solution is thus obtained which is diluted with toluene, filtered and then precipitated with alcohol. After some time, the precipitate settles and when collected and washed with alcohol, it forms a very viscous, stringy, elastic product which is soluble in benzol. Heated for about three hours at one hundred (100) degrees C. this product is transformed into a black brown mass, which is rather soft and rather elastic. Mixed with ten per cent. of sulfur and vulcanized for one hour at one hundred and thirty five (135) degrees C., this mass becomes very firm and exhibits a good degree of elasticity.

Example 6: One (1) part of sulfur dichlorid China wood oil factice (Example B) is mixed with two (2) parts of dimethyl-anilin and three (3) parts of heavy benzin. This mixture is heated to about one hundred and thirty (130) degrees C. and then for twelve hours at from one hundred and thirty to one hundred and thirty five (130 to 135) degrees C. After dilution of the fused mass with toluene it is filtered. When mixed with alcohol, the filtrate deposits a brown liquid precipitate which when collected and washed with alcohol, becomes rather solid, viscous, elastic and soluble in benzol. Heated on a water bath for two hours this product becomes firmer.

Example 7: A mixture of one (1) part of sulfur dichlorid China wood oil factice (Example B), one (1) part of rosanilin and five (5) parts of water are heated in an autoclave for from twenty five to thirty hours at about one hundred and twenty (120) degrees C. The mass obtained is first washed with boiling water, then extracted with hot alcohol to eliminate the rosanilin. When so purified and then dried, the mass is a clotted product of a dark violet color possessing a slight degree of elasticity to compression. It is insoluble in water, oil of turpentine and benzol, but very slightly soluble in alcohol, yielding a violet solution.

Example 8: A mixture of two (2) parts of sulfur dichlorid poppy oil factice (Example C), three (3) parts of alpha-naphthyl-amin and six (6) parts of heavy benzine is heated for from five to six hours at from one hundred and thirty five to one hundred and forty five (135 to 145) degrees C. The cooled fused mass is diluted with toluene and the alpha-naphthylamin hydrochlorid formed then filtered off. By precipitation of the filtrate with alcohol, a liquid mass separates which, when collected and washed with alcohol, becomes viscous and stringy. Its solution in toluene may be used as a varnish. Heated for three hours at one hundred (100) degrees C. this mass becomes firmer and rather elastic to compression and when pulled. Vulcanized for one hour at one hundred and thirty five (135) degrees C. with ten per cent. of sulfur, it becomes solid and very elastic. To vulcanize it by means of protochlorid of sulfur, a solution of twenty (20) parts of the sulfur dichlorid poppy oil alpha-naphthylamin product in one hundred and twenty (120) parts of toluene has added to it a solution of one part of protochlorid of sulfur in ten parts toluene. A thick mass immediately forms which, when dried on a water bath, becomes a brown product which is rather firm and elastic to compression but has little cohesion.

Example 9: A mixture of three parts of amido-azobenzol and eight parts of xylene is heated to about one hundred and fifteen (115) degrees C. so as to dissolve the major part of the amido-azobenzol, and then two parts of sulfur dichlorid poppy oil factice (Example C) are then added thereto. The mixture is next heated first for about ten hours at from one hundred and thirty to one hundred and thirty five (130 to 135) degrees C. and then for about six hours at from one hundred and thirty five to one hundred and forty (135 to 140) degrees C. The fused mass obtained is then largely diluted with toluene and afterward filtered through glass wool. The filtrate is distilled in order to remove the major part of the through glass wool. The filtrate is distilled has alcohol added to it which precipitates a black substance which is slightly tarry. It is then left to stand and afterward the supernatant liquid is decanted off. The black substance is then washed with alcohol, warming it gently on a water bath until it is free from amidoazobenzol. There is thus obtained a brown black mass with a greenish luster, which is stringy in a heated state and rather elastic and which is allowed to dry in air. Its solution in toluene which is yellow brown, may be used as a yellow varnish.

Example 10: One (1) part of sulfur dichlorid castor oil factice (Example D) is mixed with five parts of anilin first heated for about six hours at from one hundred and thirty to one hundred and thirty five (130 to 135) degrees C. and then for about eight hours at from one hundred and thirty five to one hundred and forty (135 to 140) degrees C. The fused product is diluted with toluene and then filtered. By the addition of alcohol to the filtrate a faintly colored mass is precipitated which is collected and washed with alcohol. In this state it is rather soluble in toluene, which solution may be used as a colorless varnish. When washed and dried at one hundred (100) degrees C. the product becomes rather hard and resinous. When hot however it is elastic.

Example 11: A mixture of one (1) part of sulfur dichlorid cod liver oil factice (Example F), and four parts of anilin is heated for about six hours at from one hundred and thirty to one hundred and thirty five (130 to 135) degrees C. The factice disappears little by little. The solution thus obtained is then diluted with about two volumes of benzol, then filtered and the filtrate precipitated with alcohol. The precipitate which coagulates rapidly, is collected, washed with alcohol and then dissolved in benzol. A limpid, faintly colored solution is thus obtained, which when applied to an object gives, after the solvent has been volatilized, an adherent, colorless and easily handled film. By precipitating this solution with alcohol, a soft elastic light yellow brown mass is deposited. Washed with alcohol and dried for one hour on a water bath it forms a mass which is elastic, solid and slightly sticky. Vulcanized for one hour at one hundred and thirty (130) degrees C. with seven per cent. of sulfur, it becomes transformed into a very firm, but elastic, product.

Example 12: A mixture of one part of sulfur dichlorid boiled linseed oil factice (Example I), two parts of heavy benzin and three parts of anilin are caused to react together the mixture being heated for about four hours at from one hundred and thirty to one hundred and thirty five (130 to 135) degrees C. The solution which is formed is diluted with twice its volume of benzol and then filtered. By the addition of alcohol to the filtrate a brown precipitate is deposited. The supernatant liquid is decantetd off. Washed with alcohol and then dissolved in benzol, the residue yields a brownish solution which may be used as a varnish. Alcohol separates from this solution a soft elastic mass which, when dried on a water bath, is transformed into a brown, elastic and very solid mass.

Example 13: A mixture of one part of linseed oil factice, (prepared with ten parts of linseed oil and three parts of protochlorid of sulfur) three parts of dimethylanilin and two parts of heavy benzin is slowly heated to about one hundred and thirty five (135) degrees C. and then the temperature is gradually raised to one hundred and forty (140) degrees C. and kept for five hours at from one hundred and forty to one hundred and fifty (140 to 150) degrees C. A mobile liquid is formed which is filtered after having been diluted with benzol. The filtrate has alcohol added to it which precipitates a semi-liquid brown substance, which when collected and washed with alcohol, becomes viscous. Heated for two hours at one hundred and ten (110) degrees C. it solidifies and forms a soft, brown and elastic product which, when vulcanized at one hundred and thirty five (135) degrees C. with ten per cent. of sulfur for two hours, still further solidifies and gives rise to an elastic brown black mass which possesses resistance when pulled.

Example 14: A mixture of one part of colza oil factice (prepared with four parts of colza oil and one part of protochlorid of sulfur) and three parts of dimethylanilin are heated for about two hours at from one hundred and thirty to one hundred and thirty five (130 to 135) degrees C. and then for about five hours at from one hundred and forty to one hundred and fifty (140 to 150) degrees C. The fused mass is poured into benzol, filtered and the filtrate then precipitated with alcohol. A brown liquid mass is deposited. Collected and washed with alcohol it forms a viscous substance which polymerizes by being heated for about two hours at from one hundred and twenty five to one hundred and thirty (125 to 130) degrees C. and then forms a dark brown transparent rather soft and sticky product which is elastic to compression.

Mixed with ten per cent. of sulfur and vulcanized for one hour at one hundred and thirty five (135) degrees C. this mass turns into a black substance still slightly soft and elastic.

Other products derived from factices and amins are indicated in the following table:

| Initial materials—Factice of— | Pts. | Temperatures and length of operations. | Properties of the masses obtained. |
|---|---|---|---|
| Linseed oil (Ex. A). 25 per cent. ammonia. Treatment in autoclave. | 1 15 .... | 125°–130° C. 15 hours. | Elastic, sticky, yellow. Soluble in toluene. |
| Linseed oil (Ex. A). Ammonium carbonate. Water. Autoclave. | 1 10 20 .... | 125°–130° C. 20 hours. | Elastic, rather soft, sticky, brown yellow. Soluble in xylene. |
| Linseed oil (Ex. A). Urea. Water. Autoclave. | 1 6 20 .... | 130°–135° C. 16 hours. | Elastic, rather solid, light brown, slightly sticky. Soluble in xylene. |
| Linseed oil (Ex. A). Meta-amidophenol. Xylene. | 1 5 15 | 135°–140° C. 10 hours. | Elastic, solid brown. Imperfectly soluble in xylene. |
| China wood oil (Ex. B). 30 per cent. monomethylamin. Autoclave. | 1 18 .... | 125°–130° C. 20 hours. | Rather elastic, rather firm, slightly sticky, brown. Partially soluble in xylene. |
| China wood oil (Ex. B). Sodium sulfanilate. Carbonate of lime. Water. Autoclave. | 1 5 1 10 .... | 135°–140° C. 30 hours. | Rather hard. Insoluble in benzol. |
| Poppy oil (Ex. C). Metatoluylenediamin. Xylene. | 1 1 4 | 130°–135° C. 15 hours. | Elastic to compression, medium cohesion, brown. Partially soluble in benzol. |
| Poppy oil (Ex. C). Benzidin. Toluene. | 1 3 10 | 125°–130° C. 10 hours. | Rather elastic, cohesion good, brown. Partially soluble in xylene. |
| Olive oil (Ex. E). Meta-amidobenzoic acid. Xylene. | 1 2 8 | 132°–137° C. 9 hours. | Plastic, firm, brown. Slightly soluble in toluene. |
| Olive oil (Ex. E). Acetoparaxylidin. Xylene. | 1 2 7 | 133°–138° C. 6 hours. | Elastic, soft, slightly sticky, brown. Imperfectly soluble in toluene. |
| Oxidized linseed oil (Ex. G). Anilin. | 3 10 | 145°–150° C. 15 hours. | Elastic, cohesion good, brown. Slightly soluble in toluene. |
| Sulfureted castor oil (Ex. H). Anilin. | 1 4 | 133°–139° C. 5 hours. | Rather elastic, firm, light brown. Soluble in xylene. |
| Oxidized linseed protochlorid of sulfur (1). Dimethylanilin. | 1 5 | 145°–155° C. 15 hours. | Elastic to compression, less when pulled, brown. Partially soluble in toluene. |
| Sulfureted castor oil protochlorid of sulfur (2). Diethylanilin. | 1 5 | 145°–155° C. 10 hours. | Rather elastic, solid brown. Slightly soluble in benzol. |
| Oxidized and sulfureted linseed oil protochlorid of sulfur (3). Dimethylanilin. | 1 6 | 135°–145° C. 5 hours. | Rather elastic, solid dark brown. Partially soluble in benzol. |
| Linseed protobromid of sulfur (4). Trimethylamin 25 per cent. Autoclave. | 1 20 .... | 133°–138° C. 15 hours. | Elastic, rather soft, slightly sticky. Imperfectly soluble in benzol. |
| Linseed tetrachlorid of sulfur (5). Anilin. | 1 4 | 125°–130° C. 6 to 7 hours. | Rather elastic, yellow of slightly resinous appearance. Soluble in xylene. |
| Linseed subiodid of sulfur (6). Paraxylidin. | 1 5 | 120°–125° C. 5 to 6 hours. | Rather elastic, soft, brown. Imperfectly soluble in xylene. |

Below are given the factices enumerated in the above six sections of the table.

(1) Factice obtained by the action of fifteen (15) parts of sulfur protochlorid upon one hundred (100) parts of oxidized linseed oil, this latter being previously diluted with one hundred (100) parts of benzol. For the preparation of the oxidized linseed oil see Example G.

(2) Factice obtained by causing twelve (12) parts of protochlorid of sulfur to react upon one hundred (100) parts of castor oil, previously sulfureted with four (4) parts of sulfur at a temperature of one hundred to two hundred (100 to 200) C.

(3) Factice prepared by the action of twelve (12) parts of protochlorid of sulfur upon one hundred (100) parts of oxidized and sulfureted linseed oil (see Example I for its preparation) this oil being previously diluted with fifty (50) parts of benzol.

(4) Factice obtained by the reaction of fifty five (55) parts of protobromid of sulfur with one hundred (100) parts of linseed oil.

(5) Factice obtained by causing one (1) part of tetrachlorid of sulfur freshly prepared and kept at a low temperature minus twenty two degrees ($-22°$) C. to act upon four (4) parts of linseed oil cooled down to minus fifteen degrees ($-15°$) C. The temperature is then allowed to rise slowly to ordinary temperature.

(6) Factice prepared by the action of a mixture of four (4) parts of sub-iodid of sulfur and ten (10) parts of benzol upon five (5) parts of linseed oil.

What I claim is:—

1. The process of making rubber-like substances which consists in subjecting a factice to the action of an amin, substantially as and for the purpose set forth.

2. The process of making rubber-like substances which consists in subjecting a factice to the action of an amin, in the presence of a substance which facilitates the reaction, substantially as described.

3. The process of making rubber-like substances which consists in subjecting a factice to the action of an amin and then hardening the substance thus produced, substantially as described.

4. The process of making rubber-like substances which consists in subjecting a factice to the action of an amin, in the presence of a substance which facilitates the reaction, and then hardening the substance thus produced, substantially as described.

5. The process of making rubber-like substances which consists in subjecting a factice to the action of an amin, hardening the substance thus produced, and subsequently vulcanizing with sulfur, substantially as described.

6. The process of making rubber-like substances which consists in subjecting a factice to the action of an amin, in the presence of a substance which facilitates the reaction, hardening the substance thus produced, and subsequently vulcanizing with sulfur, substantially as described.

Signed at American consulate general, Marseilles, France, this fourteenth day of December, 1911.

GEORGES NUTH.

Witnesses:
 GANUG,
 E. BARATIER.